Sept. 25, 1945.    H. D. BAKER    2,385,754
SEAL FOR PRESSURE VESSELS
Filed Sept. 10, 1943     2 Sheets-Sheet 1

INVENTOR
HENRY DEAN BAKER,
BY
Harvey W. Ebelblute
ATTORNEY

Sept. 25, 1945.   H. D. BAKER   2,385,754
SEAL FOR PRESSURE VESSELS
Filed Sept. 10, 1943   2 Sheets-Sheet 2

INVENTOR
HENRY DEAN BAKER,
BY
Harvey W. Edelblute
ATTORNEY

Patented Sept. 25, 1945

2,385,754

UNITED STATES PATENT OFFICE 2,385,754

SEAL FOR PRESSURE VESSELS

Henry D. Baker, New York, N. Y., assignor to Chemical Construction Corporation, New York, N. Y., a corporation of Maine Application September 10, 1943, Serial No. 501,800

2 Claims. (Cl. 220—46)

This invention relates to pressure vessels and more particularly to an improved seal for such vessels.

In the chemical industry it is frequently necessary to conduct chemical reactions under high pressures. Usually the pressure in the reaction vessel must be maintained at a high value throughout the course of the reaction. In addition, certain noxious gases or vapors as, for example, ammonia and hydrocyanic acid are frequently employed as reactants, or are evolved during the process, and it is necessary that the escape of these substances from the reaction vessel be prevented. When the pressure within the reaction vessel is comparatively low; that is, a few hundred pounds per square inch, there is no particular difficulty in providing a satisfactory seal and several efficient closures suitable for low pressures are known. However, where extremely high pressures are used it is difficult to provide a satisfactory seal for pressure vessels handling chemical substances.

In practically all types of closures for high pressure vessels, the closure is effected by a gasket generally made of a soft, impermeable material such as lead, aluminum, soft iron or the like. In some types of previously known pressure vessels the closure is made by merely inserting a gasket between the head and the body of the pressure vessel and drawing the head down on the gasket by tightening a series of stud bolts. Since these stud bolts must serve the dual purpose of holding the head in place against the internal pressure of the vessel and deforming the gasket material sufficiently to effect a seal it will be seen that the stud bolts are subjected to unduly high stresses. This type of seal is also sometimes disadvantageous in that the gasket may blow out.

To avoid the recognized disadvantages of having the head bolts carry unnecessarily high stresses, pressure vessel closures have been so designed that the internal pressure of the vessel acts to press against the gasket and make the closure effective. This type of closure has the disadvantage in that the pressure on the gasket is dependent upon the internal pressure of the vessel. Accordingly, such closures are effective only at high pressures and are quite apt to leak if the pressure vessel is operating at less than its designed operating pressure. Frequently too, the entire pressure developed on the head of the autoclave is transmitted to the gasket. Accordingly, the total pressure on the gasket is dependent upon the size of the autoclave. This sometimes causes an unduly severe pressure on the gasket material which lowers its effective life and limits the size of the pressure vessel and determines the maximum pressure that may be carried in it.

One of the objects of the present invention is to provide a pressure vessel having a seal free from the various disadvantages just mentioned. Another object of the invention is to provide a seal for pressure vessels that is simple in construction and can be easily assembled and disassembled. Still another object is to avoid unnecessary stresses in any part of the structure and to increase the effective life of the gasket material by avoiding unnecessary pressure thereon. Still other objects of the invention are to provide a seal for pressure vessels that can be made leakproof at all pressures and one in which the pressure on the gasket can be made independent of the size of the pressure vessel and the fluid pressure within. These objects and others are attained in the novel pressure vessel seal which will be described hereinafter.

In order to more readily understand my invention, reference is made to the accompanying drawings in which a preferred embodiment of the invention is illustrated in detail. It should be understood, of course, that certain obvious modifications in the structure illustrated may be made without departing from the fundamental principles thereof and that such modifications are fully intended to fall within the scope of the appended claims.

Referring to the drawings.

Figure 1:
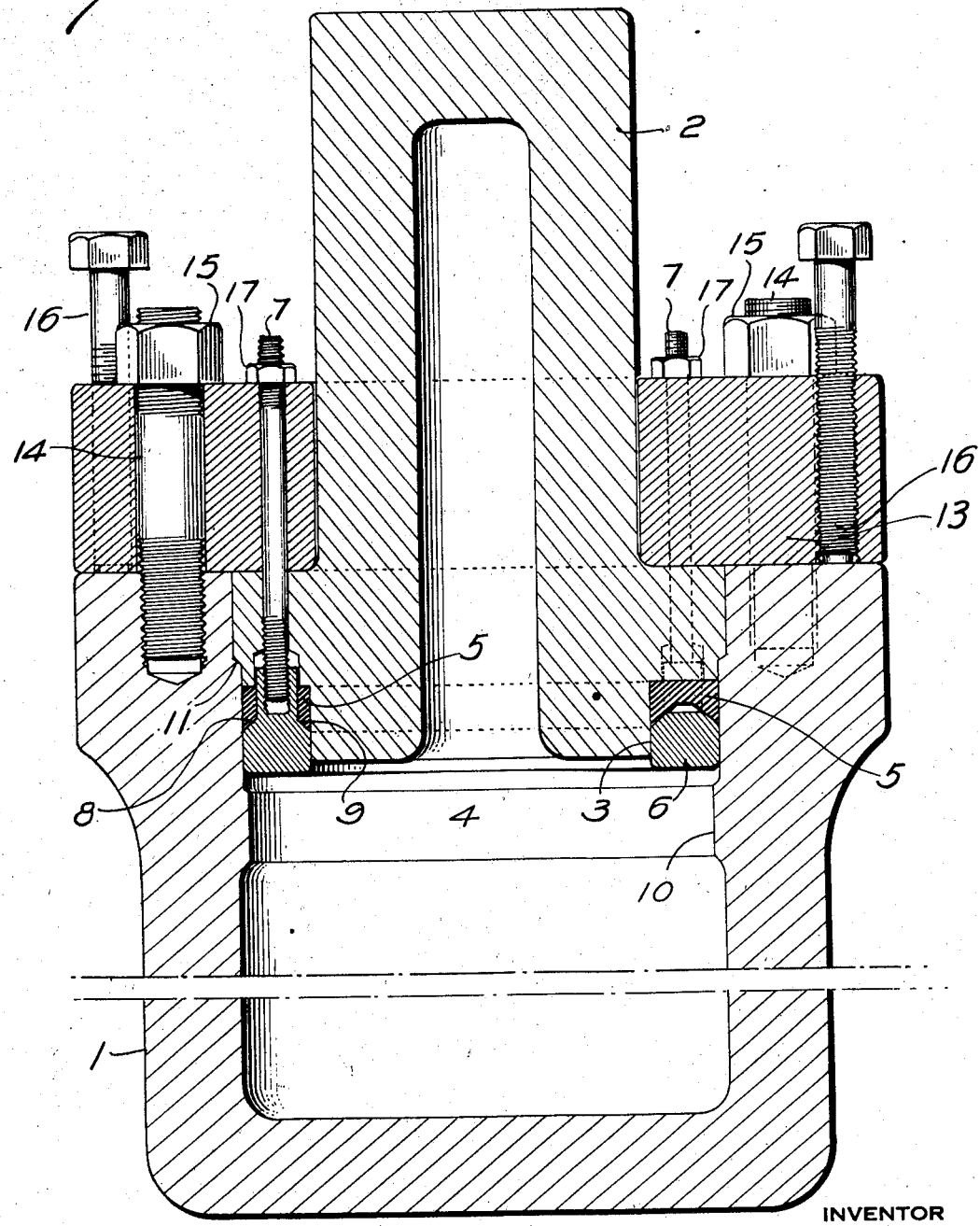
Figure 1 is a longitudinal sectional elevation of a pressure vessel fitted with the novel sealing means of the present invention.
Figure 2:
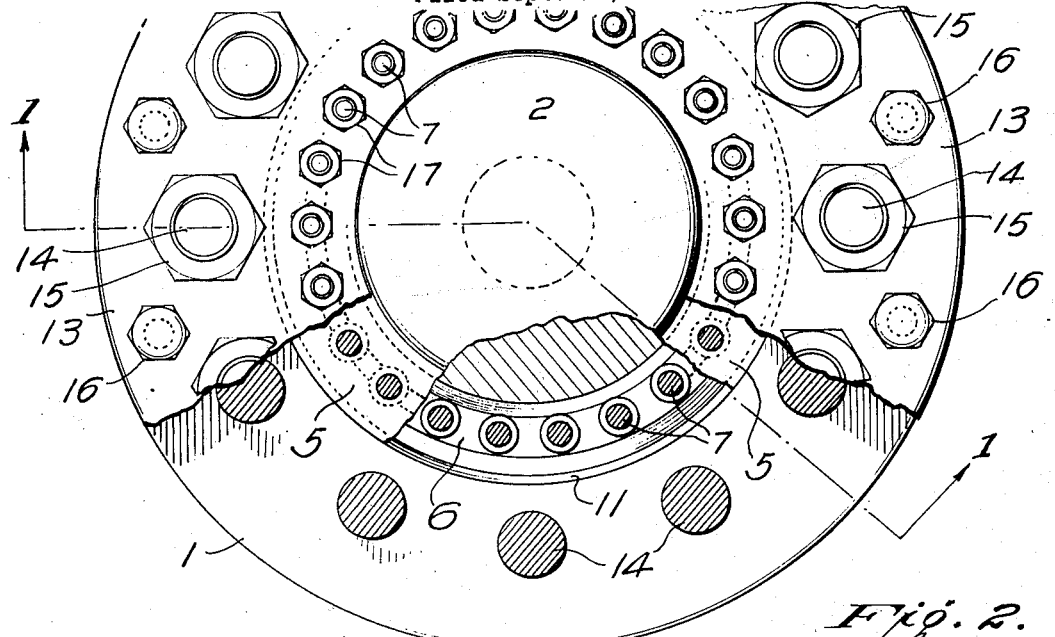
Figure 2 is a top plan view, partially broken away, of the pressure vessel.

Referring again to Figure 1, the pressure vessel is shown to comprise a cylindrical vessel 1 fitted with a removable head 2, a clamping ring 13 which holds the head in place and a pressure seal assembly comprising a gasket 5 and retaining ring 6. The pressure vessel head projects into the interior of the vessel a short distance, and has a cut out recess 3 which forms an annular space with the interior wall 4 of the pressure vessel. The gasket 5 fits into the annular space as shown.

A retaining ring 6 with stud bolts 7 also fits in the annular space and holds the gasket in position. The retaining ring illustrated has beveled edges 8 and 9 (Fig. 3) which produce a wedging effect on the gasket causing it to be defromed and fill the whole of the annular space when pressure is applied to it. Pressure on the gasket is determined by the force applied to the gasket ring through stud bolts 7 and also by the fluid pressure in the vessel. The pressure on the ring due to the internal pressure of the vessel may be modified by changing the width of ring 6. The wider the ring, the greater the deforming pressure transmitted to the gasket by the fluid pressure of the vessel. From this it will be seen that by selecting the width of the gasket ring and by tightening the stud bolts to a desired degree, it is possible to put practically any desired pressure on the gasket. Accordingly, the pressure vessel may be operated at any pressure and may be fabricated to any feasible size.

In order to facilitate assemblage of the closure the interior wall of the vessel is provided with a ledge 10 which projects inwardly. This ledge prevents the gasket ring from slipping too far down into the pressure vessel. A second ledge 11 is also provided to engage a flange-like projection 12 on the head 2 and hold it at its approximate closed position.

In the particular modification shown in Fig. 1, a clamping ring 13 overlaps both the end of the pressure vessel and a part of the head. Stud bolts 14 projecting from the end of the pressure vessel pass through holes in the ring. By tightening nuts 15 the ring 13 is held in place and prevents the outward movement of the pressure vessel head. As will be seen, stud bolts 14 carry the entire thrust developed against the head of the pressure vessel by the internal fluid pressure but are not called upon to carry any of the pressure applied to the sealing gasket. If desired the clamping ring and head may be made in one piece but this type of construction is heavier and more expensive.

On the outer periphery of clamping ring 13 a series of bolts 16 are threaded through the ring. These bolts are employed to remove the head from the pressure vessel. To remove the head, all of the nuts on the stud bolts 14 are removed and nuts 16 on stud bolt 7 are loosened. The threaded bolts 16 are then turned, thus forcing the clamping ring to rise and carry with it the pressure vessel head and seal assembly.

Figure 3:
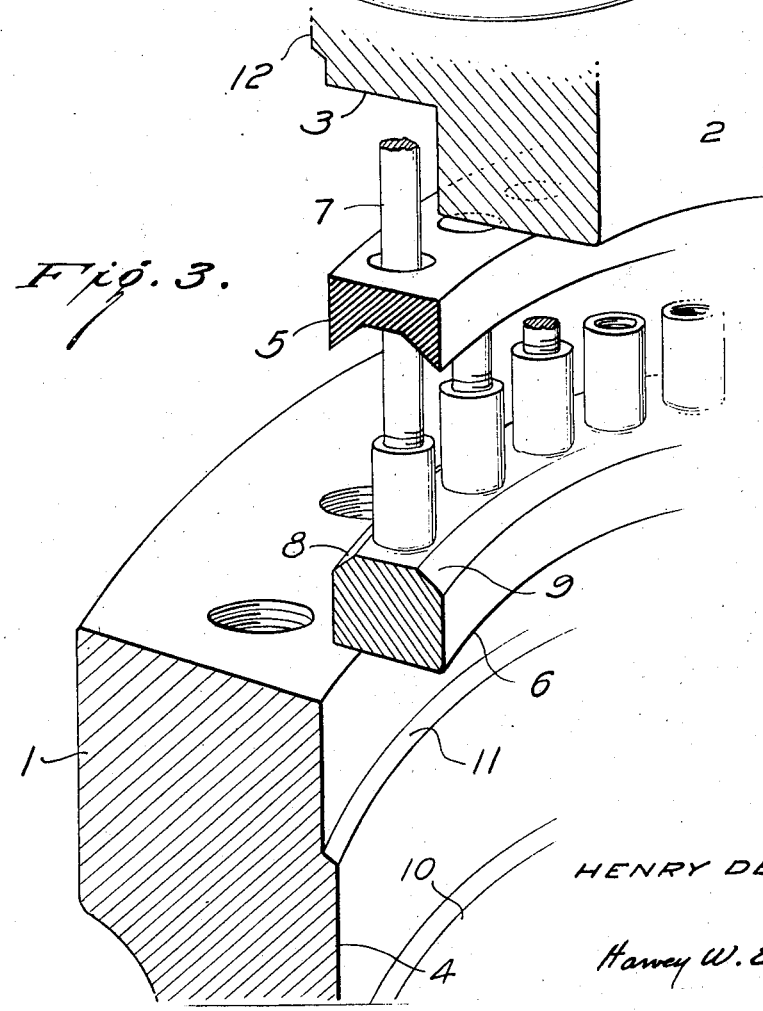
Figure 3 is a disassembled view of a section of the closure assembly taken on a vertical plane passing through radius 1 of Figure 2 showing in perspective the parts of the closure and the order in which they are assembled.

To assemble the pressure vessel closure a suitable gasket is placed over the gasket ring 6 as shown in Fig. 3. The stud bolts of the gasket ring are then inserted through complementary holes drilled in the pressure vessel head. The clamping ring is then fitted over the head with the gasket ring bolts projecting as shown in Fig. 1. Nuts 17 are then screwed on the projecting stud bolts to hold the clamping ring against the head but not so tight as to deform the gasket material. The closure assembly is then placed on the head of the pressure vessel and nuts 15 tightened. Final seal is then made by tightening nuts 17 until the gasket material completely seals the vessel.

I claim:

1. A pressure vessel for holding fluids under superatmospheric pressure comprising a cylindrical body, a removable head for the pressure vessel extending into the body of said cylindrical body and having a cut out recess forming an annular space with the interior wall thereof, a gasket and retaining ring in said annular space the retaining ring having a wedge-like face bearing upon the gasket, stud bolts extending from the retaining ring through the gasket and closure head adapted to hold and deform the gasket material against the wall of the pressure vessel and its head, a clamping ring overlapping the end of the cylindrical body and head and stud bolts projecting from the end of the body of the pressure vessel and extending through said clamping ring whereby the head may be held in place against the fluid pressure within the pressure vessel.

2. A pressure vessel for holding fluids under superatmospheric pressure comprising a cylindrical body, a removable head fitted into said body and constituting a pressure-sustaining wall of said vessel, an annular recess in the inner periphery of said head opening toward the interior of the vessel, a gasket in said recess in contact with the wall of said body and with an inner surface of said head, a retaining ring in said recess having one side thereof contacting the gasket and the opposite side thereof exposed to the interior of the vessel whereby to press the gasket against the head with a pressure proportional to the area of the ring, and means including bolts passing through said head for tightening the ring against the gasket.

HENRY D. BAKER.